United States Patent [19]

Miyoshi

[11] 4,313,413
[45] Feb. 2, 1982

[54] FUEL VAPORIZATION PROMOTING DEVICE FOR AN INTERNAL COMBUSTION ENGINE

[75] Inventor: Takeo Miyoshi, Toyota, Japan

[73] Assignee: Toyota Jidosha Kogyo Kabushiki Kaisha, Toyota, Japan

[21] Appl. No.: 93,999

[22] Filed: Nov. 14, 1979

[30] Foreign Application Priority Data

Sep. 7, 1979 [JP] Japan ................. 54-114100

[51] Int. Cl.³ .......................................... F02M 31/00
[52] U.S. Cl. .................................. 123/549; 123/548; 123/552; 261/142
[58] Field of Search .............. 123/546, 590, 549, 548, 123/552; 261/142; 219/206, 207

[56] References Cited

U.S. PATENT DOCUMENTS

| | | | |
|---|---|---|---|
| 1,706,845 | 3/1929 | Eyhon | 123/548 |
| 1,724,481 | 8/1929 | Heginbottom | 123/548 |
| 3,987,772 | 10/1976 | McBride | 123/549 |
| 4,019,483 | 4/1977 | Konomi | 123/590 |
| 4,142,327 | 2/1979 | Marcoux | 261/142 |
| 4,191,140 | 3/1980 | Matsumoto | 123/590 |
| 4,242,999 | 1/1981 | Hoser | 123/549 |

*Primary Examiner*—Ronald H. Lazarus
*Attorney, Agent, or Firm*—Kenyon & Kenyon

[57] ABSTRACT

A fuel vaporization promoting device comprises a heater vessel arranged in the collecting portion of the intake manifold of an engine. The heater vessel contains therein at least one PTC element and is shaped in the form of a flat plate. The heater element is spaced above the bottom wall of the collecting portion by a support member having a small cross-sectional area so that an air gap is formed between the lower face of the heater vessel and the bottom wall of the collecting portion. The heater vessel is actuated after the engine is operating under its own power and is turned off when the warm-up of the engine is completed.

16 Claims, 7 Drawing Figures

FUEL VAPORIZATION PROMOTING DEVICE FOR AN INTERNAL COMBUSTION ENGINE

BACKGROUND OF THE INVENTION

The present invention relates to a fuel vaporization promoting device of an internal combustion engine.

Since the temperature of an engine is normally low when the engine is started, the vaporization of the fuel fed from the carburetor is not fully promoted. As a result, a large amount of the fuel is fed into the cylinder of the engine in the form of liquid fuel, so a good combustion cannot be obtained. Therefore, the amount of harmful components in the exhaust gas is increased, and it is difficult to ensure stable operation of the engine.

In order to promote the vaporization of the fuel when an engine is started, a known fuel vaporization promoting device heats the riser portion of the intake manifold by exhaust gas which is introduced to the riser portion from the exhaust system of the engine. However, using the heat of the exhaust gas for promoting the vaporization of the fuel, has disadvantages in that the thermal efficiency is low and the temperature of the exhaust gas is not instantaneously increased after the engine is started.

To eliminate the above disadvantages, fuel vaporization promoting devices of two different types, which use a Positive Temperature Coefficient Thermistor (hereinafter referred to as a PTC element), have been proposed. The first type has a heater vessel containing the PTC element therein arranged in the riser portion of the intake manifold so that the entire surface of the bottom wall of the heater vessel is in contact with the bottom wall of the intake manifold. The second type has a heater vessel containing the PTC element therein which is inserted into a hole formed in the riser portion of the intake manifold so that the upper face of the heater vessel is exposed to the inside of the intake manifold and the lower face of the heater vessel is exposed to the atmosphere. In either type of device, since the temperature of the PTC element is instantaneously increased when voltage is applied to the PTC element, it is possible to promote the vaporization of the fuel fed from the carburetor immediately after the engine is started.

However, in the case wherein the entire surface of the bottom wall of the heater vessel is in contact with the bottom wall of the intake manifold as in a device of the above-mentioned first type, a large amount of the heat issued from the heater vessel escapes into the atmosphere through the intake manifold, with the disadvantage that the thermal efficiency is low. This is also true in the case wherein the lower face of the heater vessel is exposed to the atmosphere as in a device of the above-mentioned second type, since a large amount of the heat issued from the heater vessel directly escapes into the atmosphere.

SUMMARY OF THE INVENTION

An object of the present invention is to provide a fuel vaporization promoting device capable of effectively transferring heat from a heater vessel to the fuel fed from the carburetor.

According to the present invention, there is provided a fuel vaporization promoting device for an internal combustion engine having an intake manifold and a carburetor arranged above a collecting portion of the intake manifold, said device comprising: a power source; a thin plate-shaped heater vessel having a substantially flat upper face and a substantially flat lower face and containing therein a heater element connected to said power source; and, supporting means interconnecting the lower face of said heater vessel to a bottom wall of said collecting portion and having a portion which slightly projects from the bottom wall of said collecting portion for forming an air gap between the lower face of said heater vessel and the bottom wall of said collecting portion, said portion of said supporting means having a cross-sectional area which is much smaller than the surface area of the lower face of said heater vessel.

The present invention may be more fully understood from the description of preferred embodiments of the invention set forth below, together with the accompanying drawings.

DESCRIPTION OF THE PREFERRED EMBODIMENTS

Figure 1:
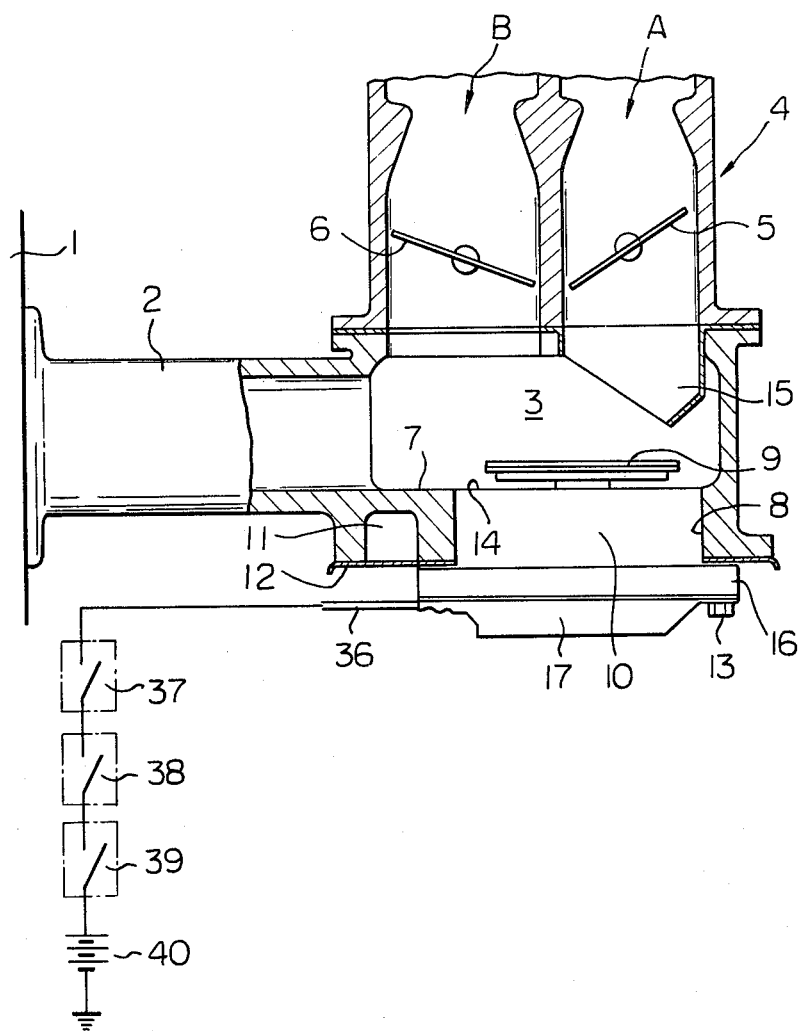
FIG. 1 is a cross-sectional side view of an intake manifold, taken along line I—I in FIG. 2.
Figure 2:
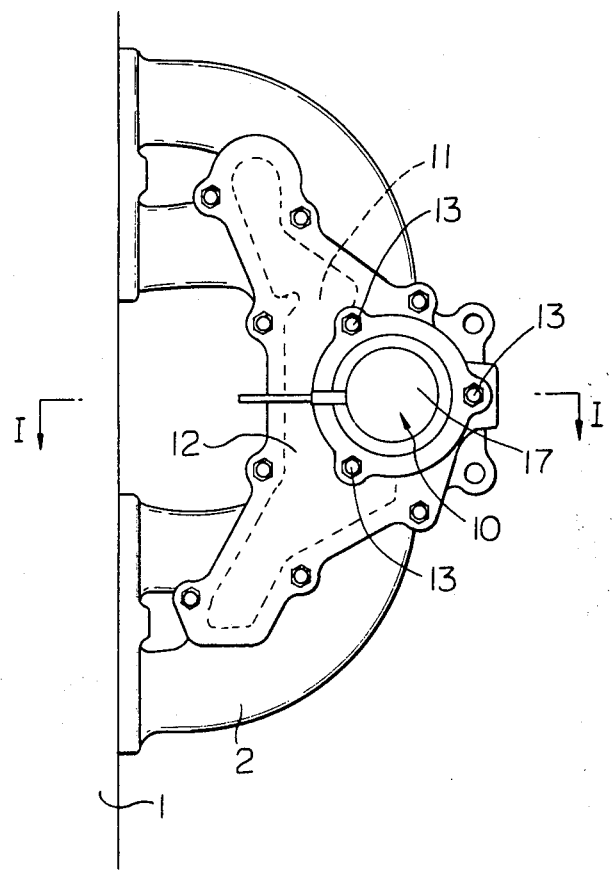
FIG. 2 is a bottom view of the intake manifold illustrated in FIG. 1.

Referring to FIGS. 1 and 2, 1 designates an engine body, 2 an intake manifold, 3 a collecting portion of the intake manifold 2; 4 designates a carburetor comprising a primary carburetor A and a secondary carburetor B; 5 designates a primary throttle valve, and 6 a secondary throttle valve. A cylindrical hole 8 is formed in the bottom wall 7 of the intake manifold 2, which is located immediately beneath the carburetor 4, and a heating device 10 equipped with a heater vessel 9 is fitted into the hole 8. A cooling water passage 11 for heating the riser portion of the intake manifold 2 is formed in the bottom wall 7 of the intake manifold 2 as illustrated by the broken line in FIG. 2, and a cover 12 covering the cooling water passage 11 is fixed onto the lower face of the intake manifold 2 together with the heating device 10 by means of bolts 13.

As illustrated in FIG. 1, the heating device 10 has an upper face 14 arranged at a level which is the same as that of the bottom wall 7 of the intake manifold 2, and the thin plate-shaped heater vessel 9 is arranged on the upper face 14 of the heating device 10 so as to be spaced from the upper face 14 by a small distance. In addition, a guide pipe 15 is mounted on the lower end of the primary carburetor A for directing mixture towards the upper face of the heater vessel 9.

Figure 3:
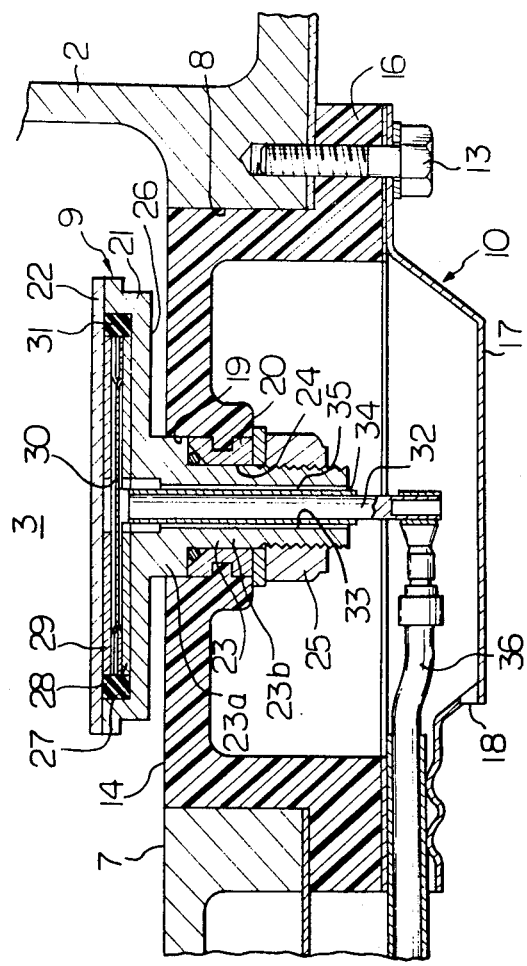
FIG. 3 is a cross-sectional side view of an embodiment of a heater device according to the present invention.

As illustrated in FIG. 3, the heating device 10 comprises a hollow base 16 made of synthetic resin and a cover 17 mounted on the lower face of the hollow base 16. A water drain hole 18 is formed on the cover 17. A vertical hole 19 is formed in the central portion of the upper wall 14 of the heating device 10, and a support ring 20 made of metallic material is fixed into the hole 19 preferably by embedding support ring 20 into when the latter is formed.

The heater vessel 9 comprises a vessel body 21 and an upper plate 22. An integral leg portion 23 that extends downwardly from the central portion of the lower face of the vessel body 21. The leg portion 23 comprises an increased diameter portion 23a and reduced diameter portion 23b, and screw threads are formed on the reduced diameter portion 23b. The increased diameter portion 23a has a diameter which is almost the same as that of the hole 19, and the reduced diameter portion 23b has a diameter which is almost the same as that of a central hole 24 of the support ring 20. The increased diameter portion 23a has a height which is greater than the distance between the upper face of the support ring 20 and the upper face 14 of the hollow base 16. Consequently, when the vessel body 21 is fixed onto the hollow base 16 by means of a nut 25 screwed onto the reduced diameter portion 23b, an air gap is formed between the upper face 14 of the hollow base 16 and a lower face 26 of the vessel body 21, as illustrated in FIG. 3. It is preferable that the increased diameter portion 23a have as small a diameter as possible, compared with the diameter of the vessel body 21.

Figure 4:
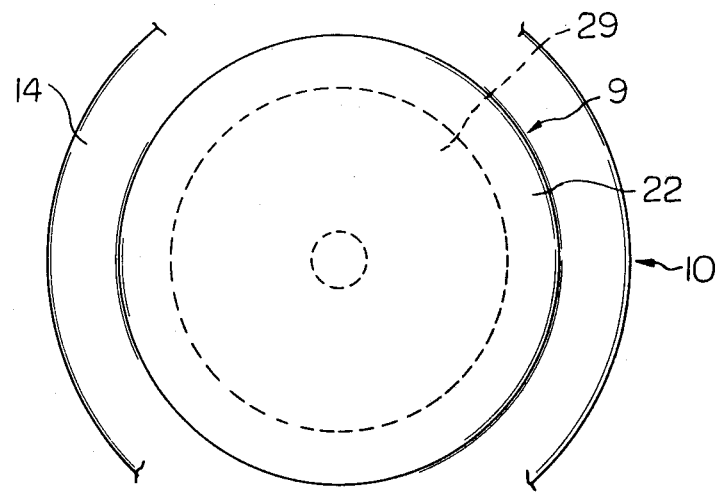
FIG. 4 is a plan view of the heater device illustrated in FIG. 3.
Figure 5:
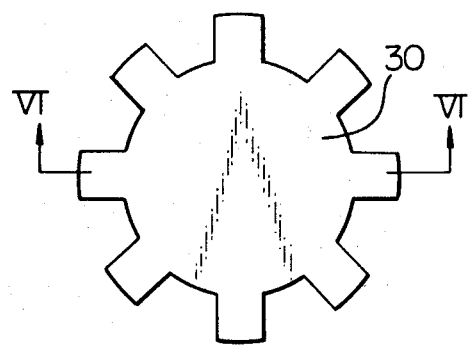
FIG. 5 is a plan view of the electrode plate illustrated in FIG. 3.
Figure 6:
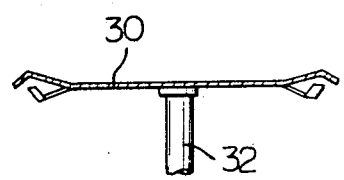
FIG. 6 is a cross-sectional side view taken along line VI—VI in FIG. 5.

As further illustrated in FIG. 3, a cylindrical shallow recess 27 is formed in the upper wall of the vessel body 21, and a pair of PTC elements 28, 29, each of which is shaped in the form of an annular disc, as illustrated by the broken lines in FIG. 4, is inserted into the recess 27 together with a resilient electrode plate 30 interposed between the PTC elements 28 and 29 and having a construction as illustrated in FIGS. 5 and 6. In addition, an insulation ring 31 arranged to enclose the outer periphery of the PTC elements 28, 29 is also inserted into the recess 27. The vessel body 21 is covered by the upper plate 22 after the PTC elements 28, 29, the electrode plate 30 and the insulation ring 31 are inserted into the recess 27. Then, the upper plate 22 and the vessel body 21 are interconnected to each other, for example by welding to complete the assembly of heater vessel 9. When the heater vessel 9 is assembled, the PTC elements 28 and 29 are pressed into sealing contact with the inner walls of the vessel body 21 and the upper plate 22, respectively by the resilient force of the electrode plate 30.

As illustrated in FIGS. 3 and 6, a terminal 32 extending downwardly is fixed onto the central portion of the lower face of the electrode plate 30. The terminal 32 passes through a circular hole 33 formed in the leg portion 23 and projects below the lower end of the leg portion 23. As illustrated in FIG. 3, a hollow cylindrical insulator 34 surrounds the terminal 32, leaving an annular air passage 35 between the circular hole 33 and the insulator 34 so that ambient air is introduced around the PTC elements 28, 29. An electric wire 36 is connected to the lower end of the terminal 32 and, as illustrated in FIG. 1, to a power source 40 via a temperature reactive switch 37, a lubricating oil pressure reactive switch 38 and an ignition switch 39.

The temperature reactive switch 37 is shut when the temperature of the cooling water of the engine is below, for example, 60° C. and is open when the temperature of the cooling water is above 60° C. The lubricating oil pressure reactive switch 38 is open when the delivery pressure of the lubrication oil pump (not shown) driven by the engine is below, for example, 0.5 kg/cm$^2$ pressure and is shut when the delivery pressure of the lubricating oil pump is above 0.5 kg/cm$^2$.

As is known to those skilled in the art, a large amount of electric current flows through the PTC elements 28, 29 (FIG. 3) when the supply of the electric current is started. Consequently, during the time the starter motor (not shown) is operated for starting the engine, it is necessary to not feed electric current to the PTC elements 28, 29 (FIG. 3). The lubricating oil pressure reactive switch 38 is provided for this purpose. When the engine is rotated by the starter motor, the delivery pressure of the lubricating oil pump is too low to switch 38, but when the engine begins to rotate under its own power, the delivery pressure of the lubricating oil pump increases sufficiently to turn switch 38 to the ON condition and thus to feed electric current to the PTC elements.

The electric current flow instantaneously increases the temperature of the PTC elements 28, 29 (FIG. 3) and, as a result, the temperature of the heater vessel 9, thereby promoting the vaporization of the liquid fuel fed from the primary carburetor A and guided by the guide pipe 15 towards the upper wall of the heater vessel 9. In addition, liquid fuel flowing along the bottom wall of the collecting portion 3 of the intake manifold 2 is heated by the radiant heat from the lower face of the heater vessel 9 and, as a result, the vaporization of the liquid fuel flowing along the bottom wall of the collecting portion 3 is also promoted.

When the temperature of the cooling water of the engine exceeds 60° C. a little while after the engine is started, the temperature reactive switch 37 opens, thereby turning off the electric current flow to the PTC elements.

Since the heater vessel 9 according to the present invention is connected to the hollow base 16 via the leg portion 23 which has a small cross-sectional area, and since the hollow base 16 is made of synthetic resin material which has a heat insulating function, the heat escaping from the heater vessel 9 through the leg portion 23 is extremely small. Furthermore, since both the upper face and the lower face of the heater vessel 9 are used for heating the fuel, the heating surface area of the heater vessel 9 is increased as compared with that of a conventional heater vessel. As a result, the thermal efficiency of the fuel vaporization promoting device is considerably improved as compared with that of a conventional device. It should be noted that if fins are formed on the upper face of the heater vessel 9, the heat issuing from the heater vessel 9 is not spent for promoting the vaporization of the fuel but is mainly spent for heating the sucked air. Consequently, it is preferable that the upper face and the lower face of the heater vessel 9 be flat surfaces.

Figure 7:
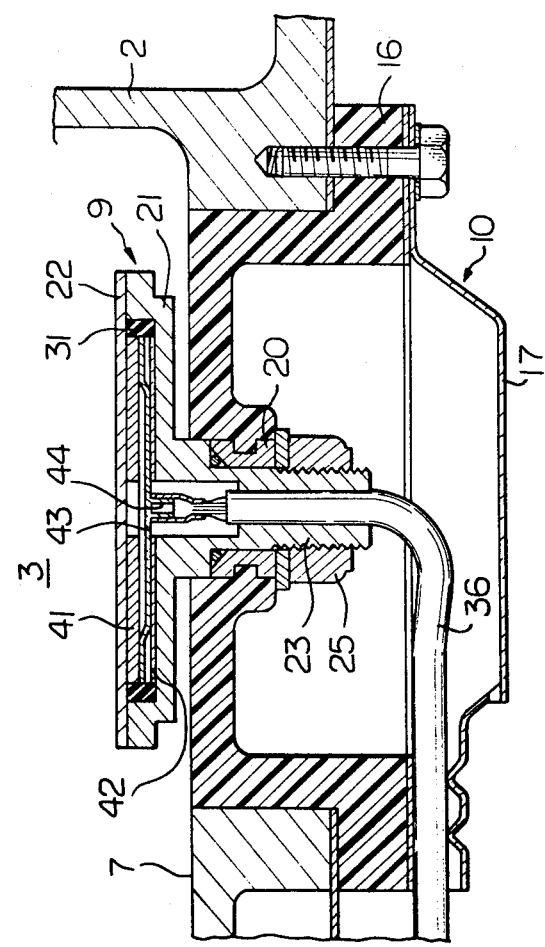
FIG. 7 is a cross-sectional side view of an alternative embodiment according to the present invention.

FIG. 7 illustrates an alternative embodiment according to the present invention. In this embodiment, a single PTC element 41 and an insulation plate 42 made of electrical insulation material, such as mica, which has a high thermal conductivity, are inserted within the heater vessel 9 together with a resilient electrode plate 43, constructed like plate 30 in FIG. 5 and interposed between the PTC element 41 and the insulation plate 42. A terminal 44 extends from the lower face of the electrode plate 43, and an electric wire 36 is connected to the terminal. If the electric wire 36 comprises a plurality of fine wires, as illustrated in FIG. 7, between the fine wires within the sheath of the electric wire 36 allow ambient air to be introduced around the PTC element 41 via the inside of the sheath.

According to the present invention, since the thermal efficiency of the fuel vaporization promoting device is improved, the vaporization of the fuel can be improved. As a result of this, since a stable combustion can be obtained even before the warm-up of an engine is completed, the amount of harmful components in the exhaust gas is reduced.

While the invention has been described by reference to specific embodiments chosen for purposes of illustration, it should be apparent that numerous modifications could be made thereto by those skilled in the art without departing from the spirit and scope of the invention.

What is claimed is:

1. A fuel vaporization promoting device for an internal combustion engine having an intake manifold with a collecting portion, and a carburetor arranged above the collecting portion, said device comprising:
    a power source;
    a thin plate-shaped heater vessel having a substantially flat upper face and a substantially flat lower face;
    a heater element contained within the heater vessel;
    resilient means also contained within the heater vessel, said resilient means interacting with said heater element to provide a good thermal connection between the heater element and both the upper and lower faces of the heater vessel;
    means for selectively connecting the heater element to the power source; and
    supporting means interconnecting the lower face of said heater vessel in spaced relation above a bottom wall of said collecting portion for forming an air gap between said lower face of said heater vessel and said bottom wall of said collecting portion, said supporting means having a cross-sectional area which is substantially smaller than the surface area of said lower face of said heater vessel, whereby the upper and lower faces of the heater vessel effectively supply heat for promoting vaporization of fuel in the collecting portion of the intake manifold.

2. A fuel vaporization promoting device as claimed in claim 1, wherein said heater vessel comprises a vessel body having a shallow recess formed therein and a cover plate fixed onto said vessel body to close said recess, said heater element being arranged in said recess.

3. A fuel vaporization promoting device as claimed in claim 2, wherein said heater vessel further comprises an insulation ring arranged in said recess so as to enclose an outer periphery of said heater element.

4. A fuel vaporization promoting device as claimed in claim 2, wherein said heater element comprises a pair of PTC elements, each PTC element being shaped in the form of a thin plate, one of said PTC elements being arranged to contact an inner wall of said cover plate, the other PTC element being arranged to contact an inner wall of said vessel body.

5. A fuel vaporization promoting device as claimed in claim 4, wherein said resilient means comprises a resilient electrode plate interposed between said PTC elements.

6. A fuel vaporization promoting device as claimed in claim 2, wherein said heater element comprises a single PTC element shaped in the form of a thin plate and arranged to contact an inner wall of one of said cover plate and said vessel body.

7. A fuel vaporization promoting device as claimed in claim 6, wherein said heater vessel further comprises an electrical insulation plate having a high thermal conductivity disposed in said recess in contact with an inner wall of the other of said cover plate and said vessel body, and said resilient means comprises a resilient electrode interposed between said PTC element and said electrical insulation plate.

8. A fuel vaporization promoting device as claimed in claim 1, wherein said bottom wall of said collecting portion has a hole formed therein, said device further comprising a base fitted into said hole and made of synthetic resin, said base having an upper face arranged at a level which is the same as that of said bottom wall of said collecting portion, and said support means is fixed onto said base.

9. A fuel vaporization promoting device as claimed in claim 8, wherein said base has therein a vertical bore, and said support means has screw threads formed on the lower end thereof and is fixed onto said base by means of a nut screwed onto said screw threads.

10. A fuel vaporization promoting device as claimed in claim 9, wherein said support means comprises a first cylindrical portion projecting downwards from said lower face of said heater vessel, a second cylindrical portion projecting downwards from a lower end of said first cylindrical portion, said second portion having a smaller diameter than the first portion and a shoulder portion interconnecting said first portion to said second portion, said bore of said base having a step portion which engages with said shoulder portion of the support.

11. A fuel vaporization promoting device as claimed in claim 9, wherein said support means has a vertical hole therein, and said means for connecting the heater element to the power source comprises an electrode plate arranged to be in contact with said heater element, a terminal extending from said electrode plate and arranged in said hole of said support means, and an electric wire connecting the electrode to said power source.

12. A fuel vaporization promoting device as claimed in claim 11, wherein said terminal has a lower end projecting from the lower end of said support means, said electric wire being connected to the lower end of said terminal.

13. A fuel vaporization promoting device as claimed in claim 11, wherein said electric wire is inserted into said vertical hole of said support means and is connected to said terminal within said vertical hole of said support means.

14. A fuel vaporization promoting device as claimed in claim 8, further comprising a cover mounted on the lower end of the base, said cover having a drain hole formed therein.

15. A fuel vaporization promoting device as claimed in claim 8, wherein a lower face of said collecting portion has a cooling water passage formed therein, and the device further comprises a cover which covers said cooling water passage and is fixed onto the lower face of said collecting portion together with said base by means of bolts.

16. A fuel vaporization promoting device as claimed in claim 1, wherein said means for selectively connecting the heater element to the power source comprises an ignition switch, an engine temperature reactive switch and a lubricating oil pressure reactive switch connected in series between said heater element and said power source, said switches being actuated to feed electric current to said heater element only when the engine is operating under its own power before the warm-up of the engine is completed.

* * * * *

UNITED STATES PATENT AND TRADEMARK OFFICE
CERTIFICATE OF CORRECTION

PATENT NO. : 4,313,413
DATED : February 2, 1982
INVENTOR(S) : Takeo Miyoshi

It is certified that error appears in the above—identified patent and that said Letters Patent is hereby corrected as shown below:

Col. 3, line 4, after "into" insert --the hollow base 16--.

Signed and Sealed this

Eleventh Day of May 1982

[SEAL]

Attest:

GERALD J. MOSSINGHOFF

Attesting Officer     Commissioner of Patents and Trademarks